(12) United States Patent
Lee

(10) Patent No.: US 9,527,546 B2
(45) Date of Patent: Dec. 27, 2016

(54) VEHICLE HAVING POSITIONAL CONTROL FUNCTION

(76) Inventor: Kook Hwan Lee, Seoul (KR)

(*) Notice: Subject to any disclaimer, the term of this patent is extended or adjusted under 35 U.S.C. 154(b) by 0 days.

(21) Appl. No.: 14/394,102

(22) PCT Filed: Apr. 23, 2012

(86) PCT No.: PCT/KR2012/003106
§ 371 (c)(1),
(2), (4) Date: Oct. 13, 2014

(87) PCT Pub. No.: WO2013/162082
PCT Pub. Date: Oct. 31, 2013

(65) Prior Publication Data
US 2015/0054252 A1    Feb. 26, 2015

(51) Int. Cl.
*B62K 21/06* (2006.01)
*B62K 21/08* (2006.01)
*B62K 5/025* (2013.01)
*B62K 5/10* (2013.01)

(52) U.S. Cl.
CPC ............ *B62K 21/06* (2013.01); *B62K 5/025* (2013.01); *B62K 5/10* (2013.01); *B62K 21/08* (2013.01)

(58) Field of Classification Search
CPC .......... B62K 21/06; B62K 5/025; B62K 5/10; B62K 3/08
USPC ........ 280/275, 276, 87.03, 87.041, 277, 283
See application file for complete search history.

(56) References Cited

U.S. PATENT DOCUMENTS

| | | | | |
|---|---|---|---|---|
| 3,742,770 A | * | 7/1973 | Flannelly | G01C 19/02 359/554 |
| 4,132,435 A | * | 1/1979 | Wilson | B62K 5/10 280/124.103 |
| 6,830,255 B2 | * | 12/2004 | Cheng | B62K 3/002 180/227 |
| 7,121,566 B2 | * | 10/2006 | McClain | A63C 17/0093 280/11.28 |
| 7,287,928 B2 | * | 10/2007 | Chen | B62K 3/002 280/87.042 |
| 7,597,333 B2 | * | 10/2009 | Stillinger | A63C 17/012 280/87.01 |

(Continued)

FOREIGN PATENT DOCUMENTS

FR  2653047 A  *  4/1991
JP  2004-114808 A     4/2004

(Continued)

*Primary Examiner* — Jacob Knutson
(74) *Attorney, Agent, or Firm* — Revolution IP, PLLC

(57) ABSTRACT

Disclosed is a vehicle having a structure in which a handle connecting frame is attached to an upper end of a front fork section in a state in which the front fork section is connected thereto, and a front wheel rotatably supported by the front fork section is able to be steered, characterized in that a main rotary shaft of the front wheel functions as a main body and a support member and is fixed at two places to simultaneously tilt two handles leftward or rightward, the main rotary shaft of the front wheel is mounted on a footrest section, and a high elasticity compound recovery member is connected between the footrest section and a rear wheel rotary shaft in a longitudinal direction to be turned leftward or rightward to correspond to a centrifugal force about the rear wheel rotary shaft when tilting occurs during running.

4 Claims, 6 Drawing Sheets

(56) References Cited

U.S. PATENT DOCUMENTS

| | | | | |
|---|---|---|---|---|
| 2002/0121756 A1* | 9/2002 | Chen | ............... | B62K 3/002 |
| | | | | 280/87.041 |
| 2003/0168273 A1* | 9/2003 | Ducharme | ............ | B62K 3/002 |
| | | | | 180/181 |
| 2003/0221888 A1* | 12/2003 | McKinney, Jr. | ......... | B62M 7/12 |
| | | | | 180/181 |
| 2009/0134591 A1 | 5/2009 | Chen et al. | | |
| 2011/0049833 A1* | 3/2011 | Kinzler | ................ | B62K 25/08 |
| | | | | 280/276 |

FOREIGN PATENT DOCUMENTS

| | | | | |
|---|---|---|---|---|
| KR | 20060085090 A | * | 7/2006 | |
| KR | 10-2006-0107443 A | | 10/2006 | |
| KR | 20070001352 U | * | 1/2007 | |
| KR | 20-0438635 Y1 | | 2/2008 | |

* cited by examiner

Fig. 3
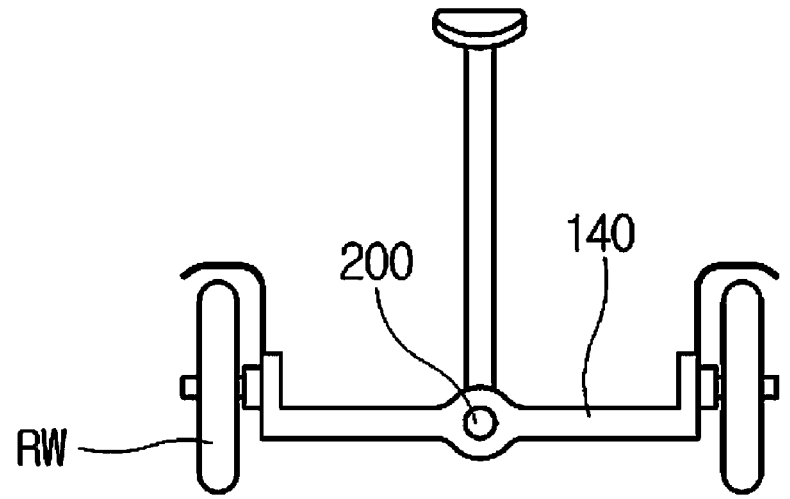
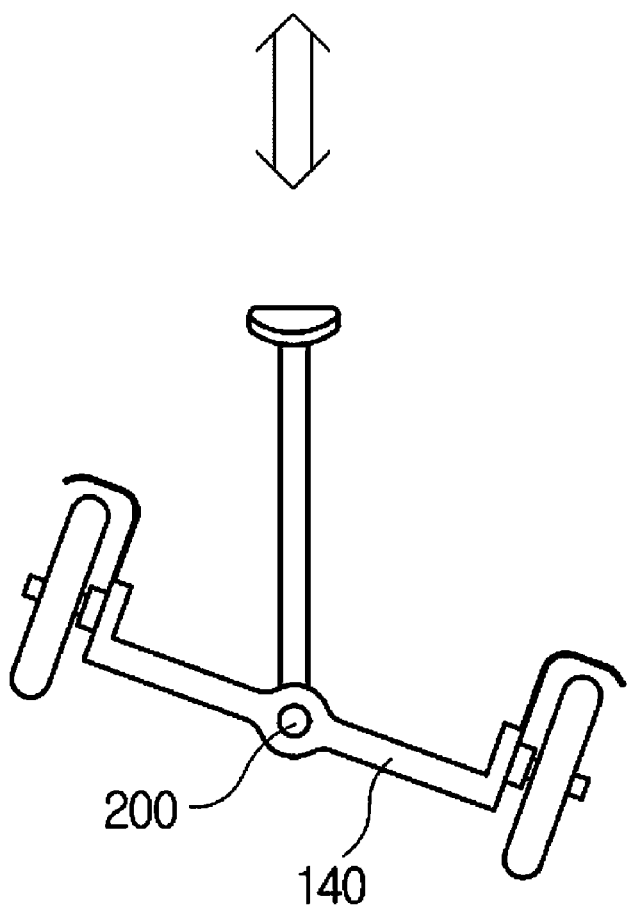

VEHICLE HAVING POSITIONAL CONTROL FUNCTION

CROSS REFERENCE TO PRIOR APPLICATIONS

This application is a National Stage Application of PCT International Patent Application No. PCT/KR2012/003106 filed on Apr. 23, 2012, under 35 U.S.C. §371, which is hereby incorporated by reference in its entirety.

TECHNICAL FIELD

The present invention relates to a vehicle having a positional control function, and more particularly, to a three-wheeled vehicle capable of minimizing a reaction such as an instable posture, forward falling, or the like, of a driver due to inertia upon braking, and continuing running while minimizing an influence due to the inertia or the like, by connecting first and second shock-absorbing sections configured to absorb a shock and support a handle section pivotally supported about a footrest section forward and rearward upon forward and rearward swing of a vehicle between a handle connecting frame and the footrest section, and absorbing a shock and resiliently supporting rear wheels pivotally in a vertical direction using third and fourth shock-absorbing sections.

BACKGROUND ART

In general, the present invention is a three-wheeled vehicle for leisure sports on which a user can ride in a standing posture. First and second shock-absorbing sections configured to absorb a shock and support a handle section pivotally supported about a footrest section in forward and rearward directions are connected between a handle connecting frame and the footrest section to push and pull each other to steer a front wheel. In this state, as both handles are tilted leftward and rightward, a front wheel is tilted and a main shaft is simultaneously rotated such that a rear wheel and a footrest are tilted in the same direction. Accordingly, as a center of gravity of the scooter is disposed inside in a rotational direction upon rapid turning while riding in a standing posture is performed, the scooter can rapidly turn by resisting a centrifugal force and improving a grip force of a tire. That is, the three-wheeled scooter of the present invention may be referred to as a new concept for a motorcycle.

For example, since three-wheeled motorcycles that are currently being sold on which a user sits and rides can be utilized for specific uses such as a load carrier or a motorcycle for handicapped, a three-wheeled motorcycle should be driven slowly, and there is no need to tilt the rear wheels or the footrest, or take a standing posture.

In addition, some enthusiasts also enjoy a standing type motorcycle having an engine mounted on a deck like a skate board with no handle as a leisure sport.

However, since the above-mentioned motorcycles are utilized for specific purposes and cannot perform running or rapid turning like skiing or water-skiing, the present invention provides specific and exclusive features of the present invention.

The present invention should satisfy several preconditions to create a new concept of leisure culture that can solve the above-mentioned problems.

First, the center of gravity should be low to enable rapid turning, and the scooter should not be separated from a turning track upon rapid turning. In addition, since a user rides the scooter in a standing posture, the scooter should have a three-wheeled shape to run with a posture like that used in skiing. In order to deal with the centrifugal force upon rapid turning, all of the three wheels should be tilted according to a variation in a center of gravity. The footrest should also be tilted in a direction perpendicular to the center of gravity in order to provide safety during turning. Since the scooter is a standing type, a user cannot accelerate the scooter using his/her feet. Accordingly, power transmission of an engine is performed with no clutch and continuously variable transmission, and an accelerator should be a handle type.

The present invention provides a standing type motorcycle capable of satisfying all of the above-mentioned conditions and configurations as described below.

SUMMARY OF INVENTION

Technical Problem

In order to solve the problems, an object of the present invention is to provide a vehicle having a positional control function. Instead of a conventional complex compound position control method, rotary shafts used for running are installed at front and rear sides to be disposed like a general three-wheeled scooter. A brake system disposed at a handle apparatus for manipulation is used to stop the scooter. In addition, as a compound elastic recovery member is employed to correct leftward and rightward tilting during running of the scooter, the scooter can appropriately turn according to a progress direction to enable advance thereof without losing a center of gravity.

Solution to Problem

In order to achieve the aforementioned objects, the present invention provides a vehicle having a structure in which a handle connecting frame is attached to an upper end of a front fork section in a state in which the front fork section is connected thereto, and a front wheel rotatably supported by the front fork section is able to be steered, characterized in that a main rotary shaft of the front wheel functions as a main body and a support member and is fixed at two places to simultaneously tilt two handles leftward or rightward, the main rotary shaft of the front wheel is mounted on a footrest section, and a high elasticity compound recovery member is connected between the footrest section and a rear wheel rotary shaft in a longitudinal direction to be turned leftward or rightward to correspond to a centrifugal force about the rear wheel rotary shaft when tilting occurs during running.

In addition, the footrest section may be tilted in the same direction as the front wheel, and both ends of the compound recovery member having one end connected to the footrest section may be fixed to each other via first and second fixing members passing through opposite ends of an outer tube and an inner tube, which are rotatable with respect to each other and coupled to each other by a pin, to apply a high elastic restoring force. In addition, the compound recovery member may be formed of multi-ply strip type elastic plates, and a polygonal bar formed of elastic rubber may be interposed between central portions of the multi-ply strip type elastic plates.

In addition, the outer tube and the inner tube may be connected at a connecting section via a bearing to be smoothly rotated.

In addition, the support member may be constituted by a cover type frame that functions as a battery housing configured to enclose a battery.

Advantageous Effects of Invention

According to the present invention, even when no separate position control apparatus is employed, rotary shafts used for running may be installed at front and rear sides to be disposed like a general three-wheeled scooter. A brake system disposed at a handle apparatus for manipulation is used to stop the scooter. In addition, as a compound elastic recovery member is employed to correct leftward and rightward tilting during running of the scooter, the scooter can appropriately turn according to a progress direction to enable advance thereof without losing a center of gravity, thereby performing a positional control function.

BRIEF DESCRIPTION OF DRAWINGS

FIG. 3 is a longitudinal cross-sectional view showing the structure of the three-wheeled vehicle shown in FIG. 2;

DESCRIPTION OF EMBODIMENTS

Hereinafter, a configuration of the present invention will be described in detail with reference to the accompanying drawings to be easily understood and reproduced by those skilled in the art.

Figure 1:
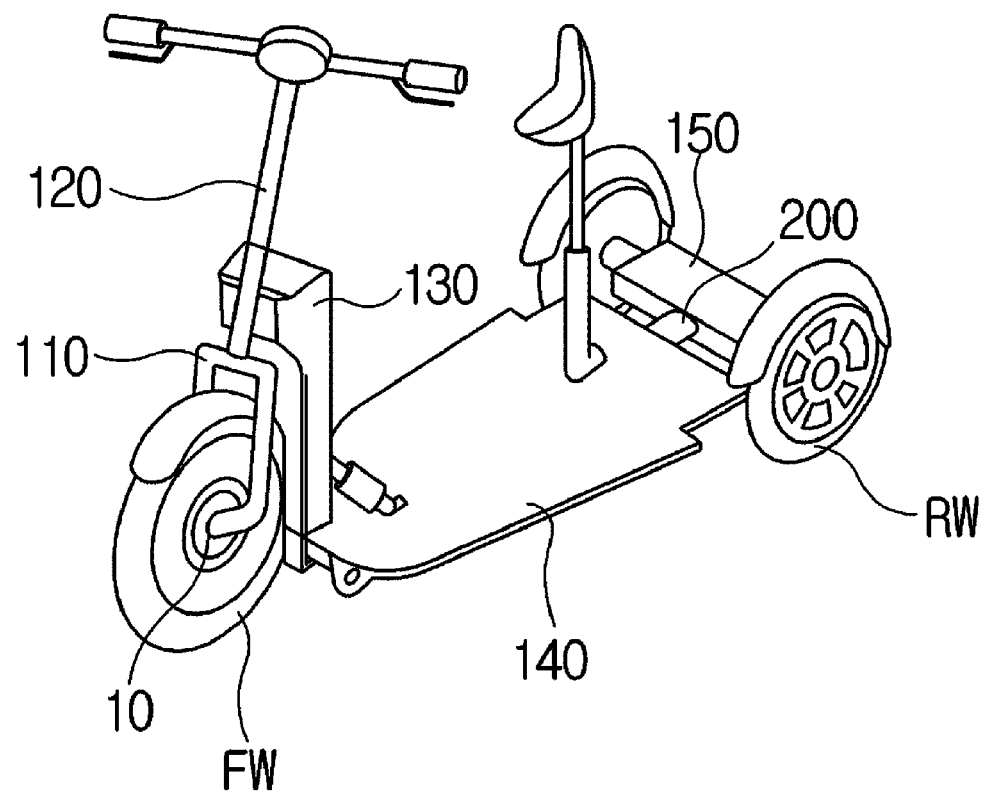
FIG. 1 is a perspective view showing a structure of a three-wheeled vehicle according to an embodiment of the present invention.
Figure 2:
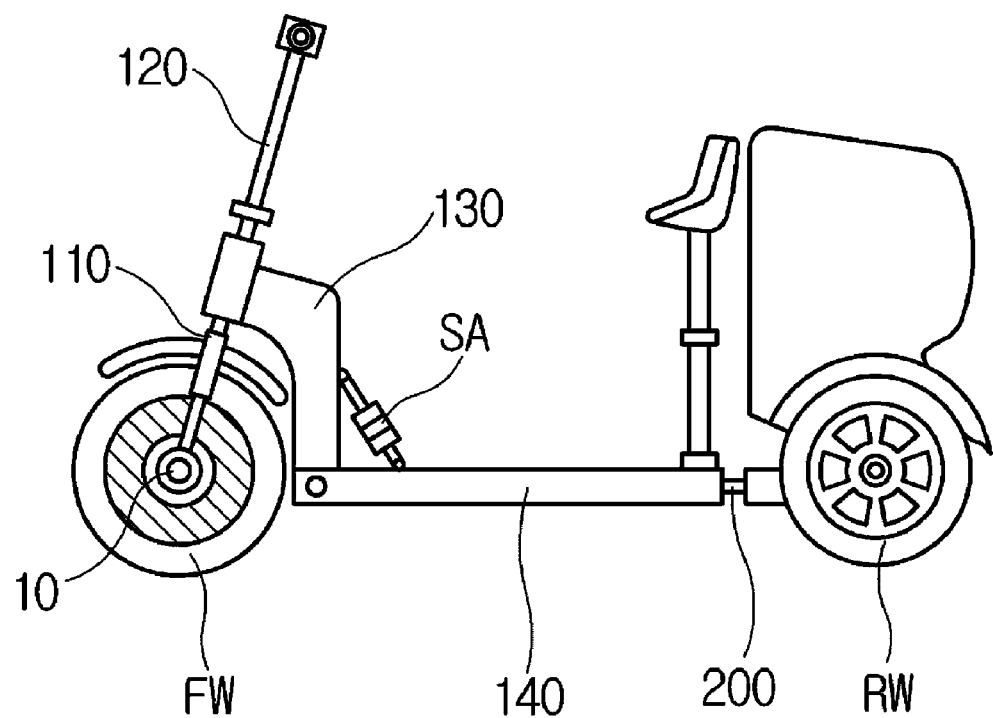
FIG. 2 is a front view showing the structure of the three-wheeled vehicle shown in FIG. 1.
Figure 4:
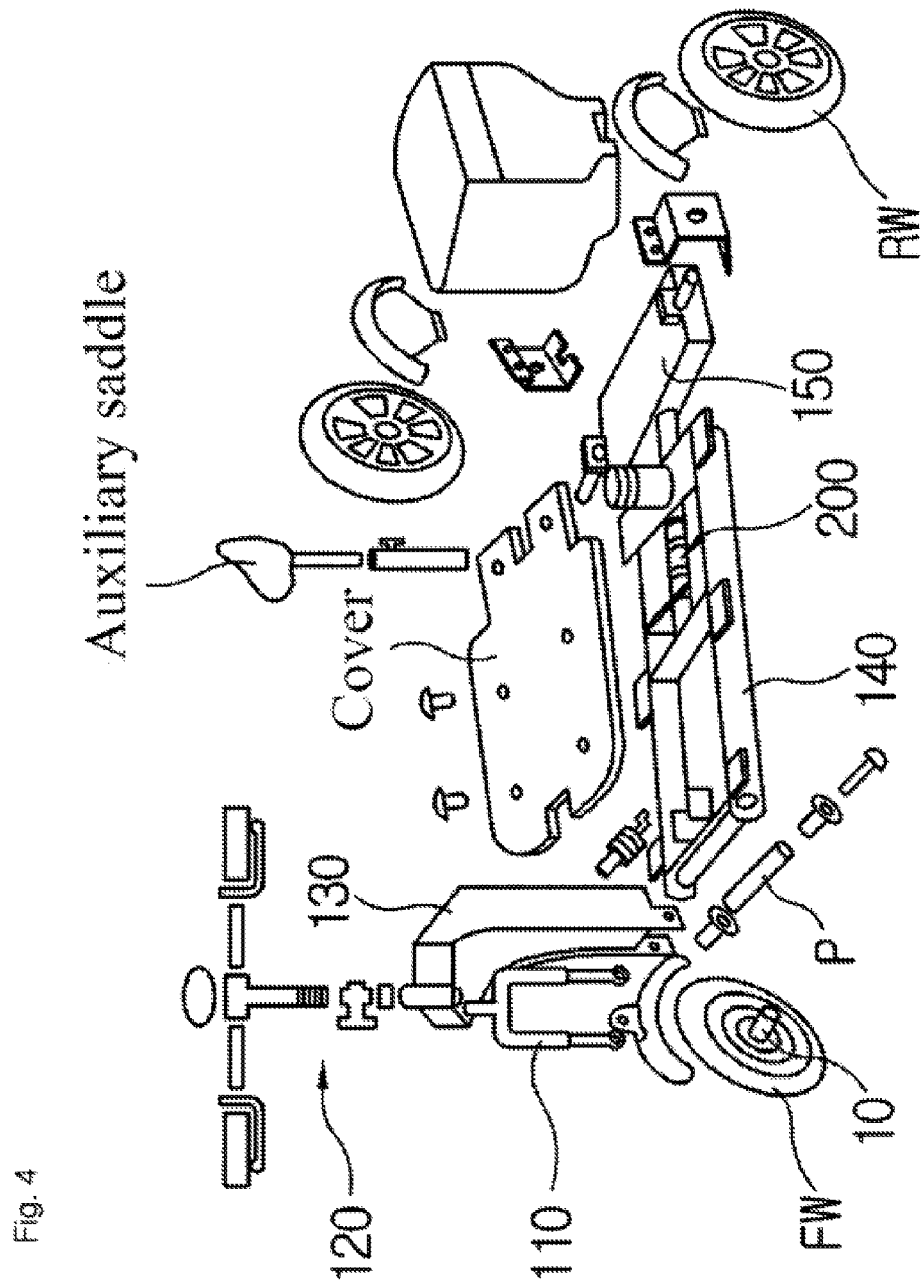
FIG. 4 is an exploded perspective view showing the structure of the three-wheeled vehicle according to the embodiment of the present invention shown in FIG. 1.
Figure 5:
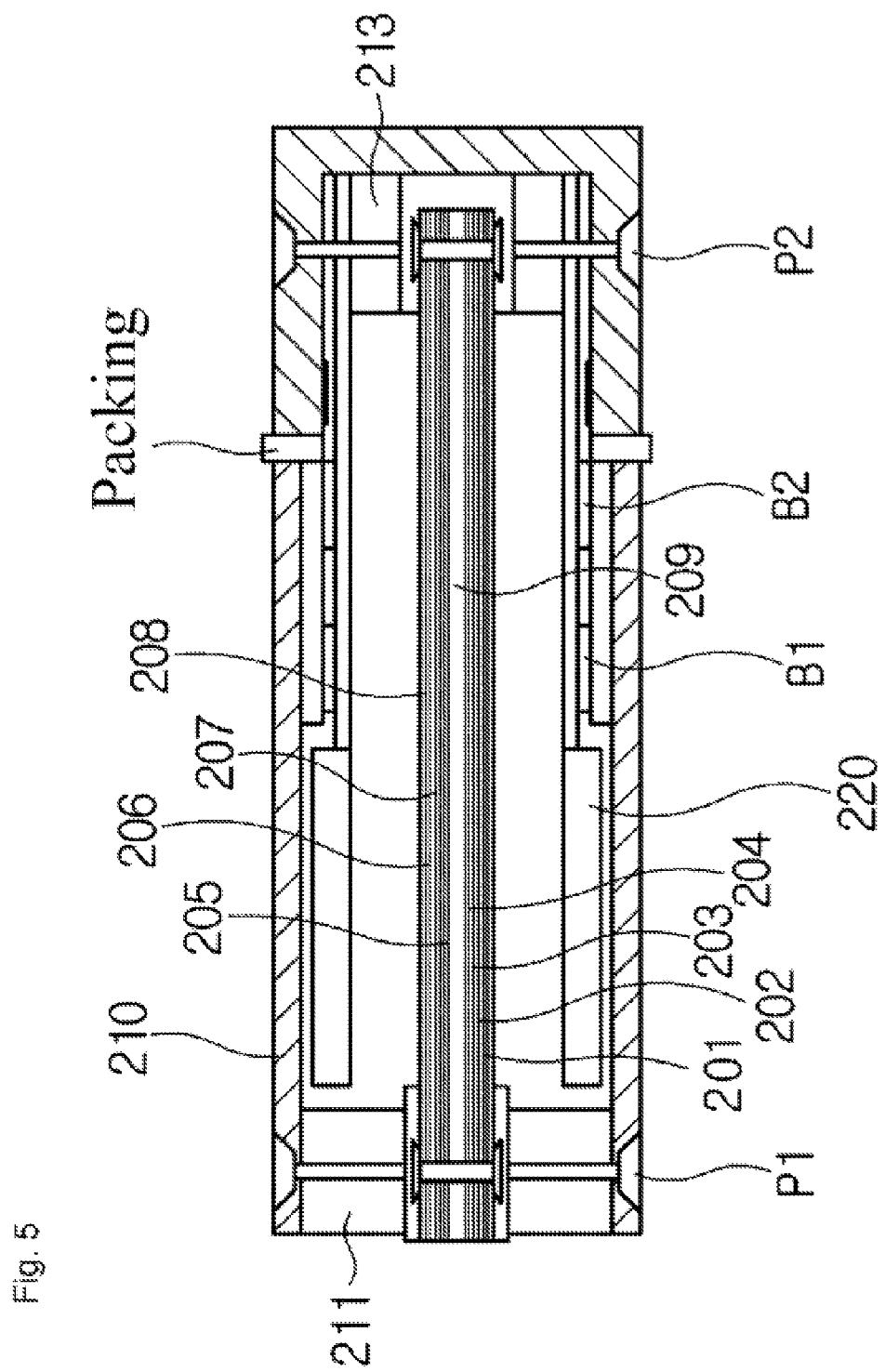
FIG. 5 is a longitudinal cross-sectional view showing a structure of a compound elastic recovery member as a positional control means shown in FIG. 3.
Figure 6:
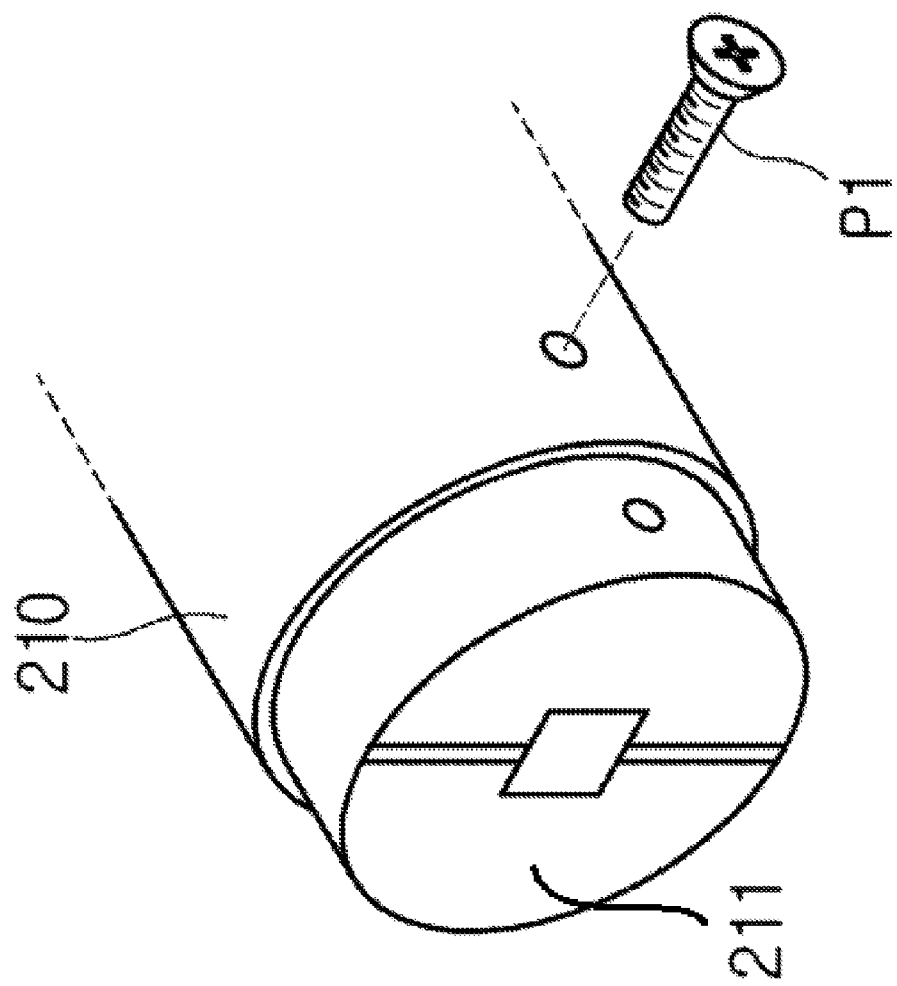
FIG. 6 is a configuration view of an end of the compound elastic recovery member of FIG. 5.

FIG. 1 is a perspective view showing a structure of a three-wheeled vehicle according to an embodiment of the present invention, FIG. 2 is a front view showing the structure of the three-wheeled vehicle shown in FIG. 1, FIG. 3 is a longitudinal cross-sectional view showing the structure of the three-wheeled vehicle shown in FIG. 2, FIG. 4 is an exploded perspective view showing the structure of the three-wheeled vehicle according to the embodiment of the present invention shown in FIG. 1, FIG. 5 is a longitudinal cross-sectional view showing a structure of a compound elastic recovery member as a positional control means shown in FIG. 3, and FIG. 6 is a configuration view of an end of the compound elastic recovery member of FIG. 5.

The present invention is deduced as an example of a three-wheeled vehicle on which a driver can ride while standing or sitting. A hub motor 10 has the same configuration as the conventional handle in that the hub motor is a continuously variable transmission and no clutch type and includes a finger-adjusted accelerator mounted on a right handle like a scooter.

In addition, a handle connecting frame 120 is attached to an upper end section of a front fork section 110 while the front fork section 110 is connected thereto, and a front wheel FW rotatably supported by the front fork section 110 can be steered.

A main rotary shaft of the front wheel FW is a support member 130 that functions as a main body and is configured to receive a battery, and has a structure fixed to two places that is configured to simultaneously tilt both of the handles leftward or rightward. The main rotary shaft of the front wheel FW is mounted between the handle connecting frame 120 and a footrest section 140 via the support member 130. In addition, a compound recovery member 200 having high elasticity is connected between the footrest section 140 and the rear wheel rotary shaft 150 in a longitudinal direction to be laterally rotated about a rear wheel rotary shaft 150 when tilted during running.

Here, the footrest section 140 is tilted in the same direction as the front wheel. The compound recovery member 200 having one end connected to the footrest section 140 passes through opposite ends of an outer tube 210 and an inner tube 220, which are rotatable with respect to each other, to be fixed to each other at both ends thereof via first and second fixing members 211 and 213 fixed via the pins P1 and P2 to apply a high elastic restoring force.

The compound recovery member 200 is constituted by multi-ply strip type elastic plates 201 to 208. Preferably, a polygonal bar formed of elastic rubber 209 is disposed at a central portion of the multi-ply strip type elastic plates 201 to 208.

Of course, the outer tube 210 and the inner tube 220 are connected at a connecting section via bearings B1 and B2 to be smoothly rotated.

Meanwhile, since the compound recovery member 200 is a structure in which the multi-ply elastic plate and the elastic rubber 209 are integrated at both ends via C-shaped fixing members 211 and 213, the compound recovery member 200 can smoothly perform a position recovery control function of the footrest section and the handle with left and right strong elastic forces, which is stronger than the conventional art.

In addition, reference character SA is a suspension configured to attenuate a shock of the front wheel FW. Shock absorbers may be employed at both sides to assist the elastic force.

In addition, the support member 130 is constituted by a cover type frame that functions as a battery housing configured to enclose the battery.

In addition, the main rotary shaft of the front wheel FW is configured to accommodate the hub motor. When the scooter turns leftward or rightward while running, even though the scooter continuously turns according to tilting of the handle and the footrest section 140, the driver can easily tilt and drive the body, the handle and the footrest section 140. Accordingly, the driver can enjoy the three-wheeled vehicle as much as skiing and water-skiing, thereby creating a new leisure sports culture.

Embodiments of the invention have been discussed above with reference to the accompanying drawings. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the embodiments described and shown above. That is, there are numerous modifications and variations of the invention that are too numerous to be listed but that all fit within the scope of the invention.

The invention claimed is:

1. A vehicle having a structure in which a handle connecting frame is attached to an upper end of a front fork section, and a front wheel rotatably supported by the front fork section for steering, wherein
   a main rotary shaft of the front wheel configured to serve as both a main body and a support member, the main rotary shaft is fixed at two places to simultaneously tilt two handles leftward or rightward, and
   the main rotary shaft of the front wheel is mounted on a footrest section, and a high elasticity compound recovery member is connected between the footrest section and a rear wheel rotary shaft in a longitudinal direction to be turned leftward or rightward based on a centrifugal force of the rear wheel rotary shaft when tilting occurs during running, wherein
   the footrest section is tilted in the same direction as the front wheel, wherein
   the compound recovery member is formed of multi-ply strip type elastic plates, and a polygonal bar formed of elastic rubber is interposed between central portions of the multi-ply strip type elastic plates, wherein
   a fixing member includes a first fixing member and a second fixing member, each of the first fixing member and the second fixing member is fixed at opposite ends of an outer tube and an inner tube respectively, and wherein
   the compound recovery member, the outer tube and the inner tube are fixed by a pin.

2. The vehicle according to claim 1, wherein the support member is constituted by a cover type frame that functions as a battery housing.

3. The vehicle according to claim 1, wherein the vehicle is able to be selectively employed as a scooter and a three-wheeler.

4. A vehicle comprising:
   a front fork section configured to rotatably support a front wheel;
   a handle connecting frame installed at the front fork section and configured to steer the front wheel;
   a footrest section having a plate shape;
   a support member installed at the footrest section and configured to support at least one of the front fork section and the handle connecting frame; and
   a compound recovery member installed between the footrest section and a rear wheel rotary shaft configured to rotate a rear wheel installed in the footrest section in a longitudinal direction, wherein
   the compound recovery member comprises multi-ply strip type elastic plates and an elastic rubber member disposed in a center of the elastic plates, wherein
   both ends of the compound recovery member are respectively fixedly coupled to the footrest section and the rear wheel rotary shaft via a fixing member including a first fixing member and a second fixing member, each of the first fixing member and the second fixing member being fixed at opposite ends of an outer tube and an inner tube, respectively, wherein
   the compound recovery member, the outer tube and the inner tube are fixed by a pin, and wherein
   the footrest section is tilted in the same direction as the front wheel.

* * * * *